United States Patent [19]

Filkin

[11] Patent Number: 5,046,020
[45] Date of Patent: Sep. 3, 1991

[54] DISTRIBUTED PARALLEL PROCESSING NETWORK WHEREIN THE CONNECTION WEIGHTS ARE GENERATED USING STIFF DIFFERENTIAL EQUATIONS

[75] Inventor: David L. Filkin, Wilmington, Del.
[73] Assignee: E. I. du Pont de Nemours and Company, Wilmington, Del.
[21] Appl. No.: 285,534
[22] Filed: Dec. 16, 1988
[51] Int. Cl.$^5$ ............................................. G06F 15/18
[52] U.S. Cl. .................................................... 364/513
[58] Field of Search ........................ 364/513, 900, 200

[56] References Cited

U.S. PATENT DOCUMENTS 4,773,024 9/1988 Faggin et al. ....................... 364/513

FOREIGN PATENT DOCUMENTS

W08807234 9/1988 PCT Int'l Appl.

OTHER PUBLICATIONS

Widrow, "Generalization and Information Storage in Networks of ADELINE Neurons," Self Organizing Systems, Yovitts, Editor, Spartan Books, NY (1962), pp. 435-461.
Rumelhart et al., "Learning Internal Representations by Error Propagation," Parallel Distributed Processing, vol. 1, Foundations, pp. 318-362.
Kung et al., "An Algebraic Projection Analysis for Optimal Hidden Units Size and Learning Rates in Back--Propagation Learning," IEEE International Conf. on Neural Networks, pp. I-363 to I-370.
Kollias et al., "Adaptive Training of Multilayer Neural Networks Using a Least Squares Estimation Technique," IEEE, pp. I-383 to I-399.
Gelband et al., "Neural 'Selective' Processing and Learning," IEEE, pp. I-417 to I-424.
Hush et al., "Improving the Learning Rate of Back--Propagation with the Gradient Reuse Algorithm", IEEE, pp. I-441 to I-446.

Primary Examiner—Allen R. MacDonald

[57] ABSTRACT

A parallel distributed processing network of the back propagation type is disclosed in which the weights of connection between processing elements in the various layers of the network are determined in accordance with the set of steady solutions of the stiff differential equations governing the relationship between the layers of the network.

12 Claims, 5 Drawing Sheets

DISTRIBUTED PARALLEL PROCESSING NETWORK WHEREIN THE CONNECTION WEIGHTS ARE GENERATED USING STIFF DIFFERENTIAL EQUATIONS

BACKGROUND OF THE INVENTION

A portion of the disclosure of this patent document contains material which is subject to copyright protection. The copyright owner has no objection to the facsimile reproduction by anyone of the patent document or patent disclosure, as it appears in the Patent and Trademark Office patent file or records, but otherwise reserves all copyright rights whatsoever.

1. Field of the Invention

The present invention relates to a distributed parallel processing network of the form of a back propagation network having an input layer, an intermediate (or hidden) layer, and an output layer, and in particular, to such a network in which the interconnection weights between the input and hidden layers and between the hidden and the output layers are determined by the steady state solutions of the set of stiff differential equations that define the relationships between these respective layers.

2. Description of the Prior Art

A parallel distributed processing network is a computational circuit which is implemented as a multi-layered arrangement of interconnected processing elements. In a typical arrangement of a parallel distributed processing system, known as the back propagation network, the network architecture includes at least three layers of processing elements: a first, or "input", layer; a second, intermediate or "hidden", layer; and a third or "output", layer. Each processing element has an input and an output port, and operates on an input applied thereto to transform that input in accordance to a predetermined transfer function. The transfer function usually takes the form of a sigmoid function having a predetermined threshold associated therewith that is operable to produce an output bounded between zero and one.

The input port of each processing element in the input layer is connectible to at least one input signal while the output port of each of the processing elements in the input layer is connected to at least one, and typically to a plurality, of the processing elements in the intermediate layer. Similarly, the output port of each of the processing elements in the intermediate layer is connectible to at least one, and typically to a plurality, of the processing elements in the output layer.

The connection lines between the elements in the input layer and those in the intermediate layer and the connection lines between the elements in the intermediate layer and those in the output layer each have a "connection weight" associated therewith. Generally speaking, with respect to the elements in the hidden and the output layers, the magnitude of any signal at the input of a processing element in these layers is the summation over all of the inputs of the inner vector product of the activation strength of each input signal and the connection weight of the corresponding connection line on which it is carried plus the threshold of the processing element.

A network such as that described is trained using a learning rule known as the "Generalized Delta Rule" described in Rumelhart, Hinton and Williams, "Learning Internal Representations by Error Propagation", *Parallel Distributed Processing, Volume 1, Foundations*, Rumelhart and McClelland, editors, MIT Press, Cambridge, Mass. (1986). This rule is generalization of the "Delta Rule" given by Widrow, "Generalization and Information Storage in Networks of ADELINE Neurons", *Self Organizing Systems*, Yovitts, editor, Spartan Books, New York (1962).

Using such a training rule the network is presented sequentially with a number of "training patterns" relating the activation strengths of the input signals at the input elements to the corresponding values at the output ports of the elements in the output layer. All the connection weights are then varied together to minimize the error in the network's predicted outputs. To change the weights in accordance with the method of steepest descent the gradient of the error with respect to the weights is found and the weights changed to move the error toward smaller values. The weights are changed iteratively, in accordance with the following relationship:

$$\Sigma \Delta W^n = \text{eta } \Delta W[gd] + \text{alpha } \Delta W^{n-1} \qquad (1)$$

where
$\Delta W[gd]$ represents the weight changes for gradient or steepest descent,
$\Delta W^n$ represents the weight change applied at iteration number n,
$\Delta W^{n-1}$ represents the weight change from the previous iteration,
eta represents the "learning rate" of the network and alpha represents the "momentum" term.

Training occurs in discrete steps or iterations, each requiring one presentation of all the training patterns to the network. In order to assure convergence of the iterative algorithm the learning rate eta must be chosen small enough so that oscillations and instabilities do not occur. The momentum term alpha is provided to increase the convergence rate and to help avoid the problem of being trapped in local minima of the least-squares surface.

It is well known in the art that although the training rule gives a finite-step change in the weights that corresponds approximately to the direction of gradient or steepest descent, it does not always converge. Perhaps more problematic, the training is initially fairly rapid, but eventually training becomes extremely slow, especially as the network becomes more accurate in predicting the outputs. Training to great accuracy can take thousands or even millions of presentations of the training set. The number of training presentations required grows rapidly with the size of the network, usually more rapidly than the square of the number of connections.

During the IEEE International Conference on Neural Networks, San Diego, Calif., in July 24-27, 1988, a number of papers were presented on techniques to increase the training speed of a back propagation network. These papers are available in the proceedings of the conference as published for the IEEE by SOS Printing of San Diego, Calif. The paper by Kung and Howard, at pages 363 to 370, describes a method to predict the optimal number of hidden layer elements needed. By using only the minimum number, the training rate can be optimized. In the paper by Kollias and Anastassiou, at pages 383 to 390, the Marquhardt-Levenberg least squares optimization technique is used to improve convergence. The paper by Gelband and Tse, at pages 417 to 424, describes a method of generalizing the threshold logic function to a "selective" function thereby effectively reducing the multilayer network to a single layer and thus increasing the learning rate. The paper of Hush and Salas, at pages 441 to 447 describes a method called the "Gradient Reuse Algorithm" which speeds the training rate.

Accordingly, in view of the foregoing it is believed to be advantageous to provide a back propagation network which is more expeditiously trained.

SUMMARY OF THE INVENTION

The present invention relates to a multilayered parallel distributed processing network using the architecture of the back propagation network. Such a network includes at least three layers of processing elements. The first, or input, layer, has a set of at least one to i processing elements, each of which has an input port and an output port and each of which operates on an input in accordance with a predetermined transfer function to produce an activation signal Al(i) at the output port. The second or intermediate layer has a set of at least one to k processing elements, each having an input port and an output port. Each processing element in the intermediate layer operates on an input in accordance to a predetermined transfer function to produce an activation signal A2(k) at the output port thereof. The third, or output layer, has a set of at least one to j processing elements. Each output processing element also has an input and an output port. Each processing element in the output layer operates on an input in accordance to a transfer function to produce an activation signal A3(j) at its output port.

The output port of each of the processing elements in the input layer is connected by a line having a connection weight W1 to the input of at least one of the processing elements of the intermediate layer. Similarly, the output port of each of the processing elements of the intermediate layer is connected by a line having a connection weight W2 to the input of at least one of the processing elements of the output layer. The network is trained by applying at the input port of the input layer a training signal producing activation signals A1, A2 and A3. Each training signal has a desired output signal V associated therewith.

In accordance with the present invention the weight W1 and W2 are determined by solving the set of stiff differential equations relating the various layers of the network:

$$d/dt\ W2[k,j] = \sum_p A2[k,p]A3[j,p](1 - A3[j,p])(V[j,p] - A3[j,p])$$

$$d/dt\ W1[i,k] = \sum_p A1[i,p]A2[k,p](1 - A2[k,p]) \times$$

$$\sum_j (V[j,p] - A3[j,p])A3[j,p](1 - A3[j,p])W2[k,j])$$

BRIEF DESCRIPTION OF THE DRAWINGS

The invention will be more fully understood from the following detailed description, taken in connection with the accompanying drawings, which form a part of this application and in which.

Figure 4:
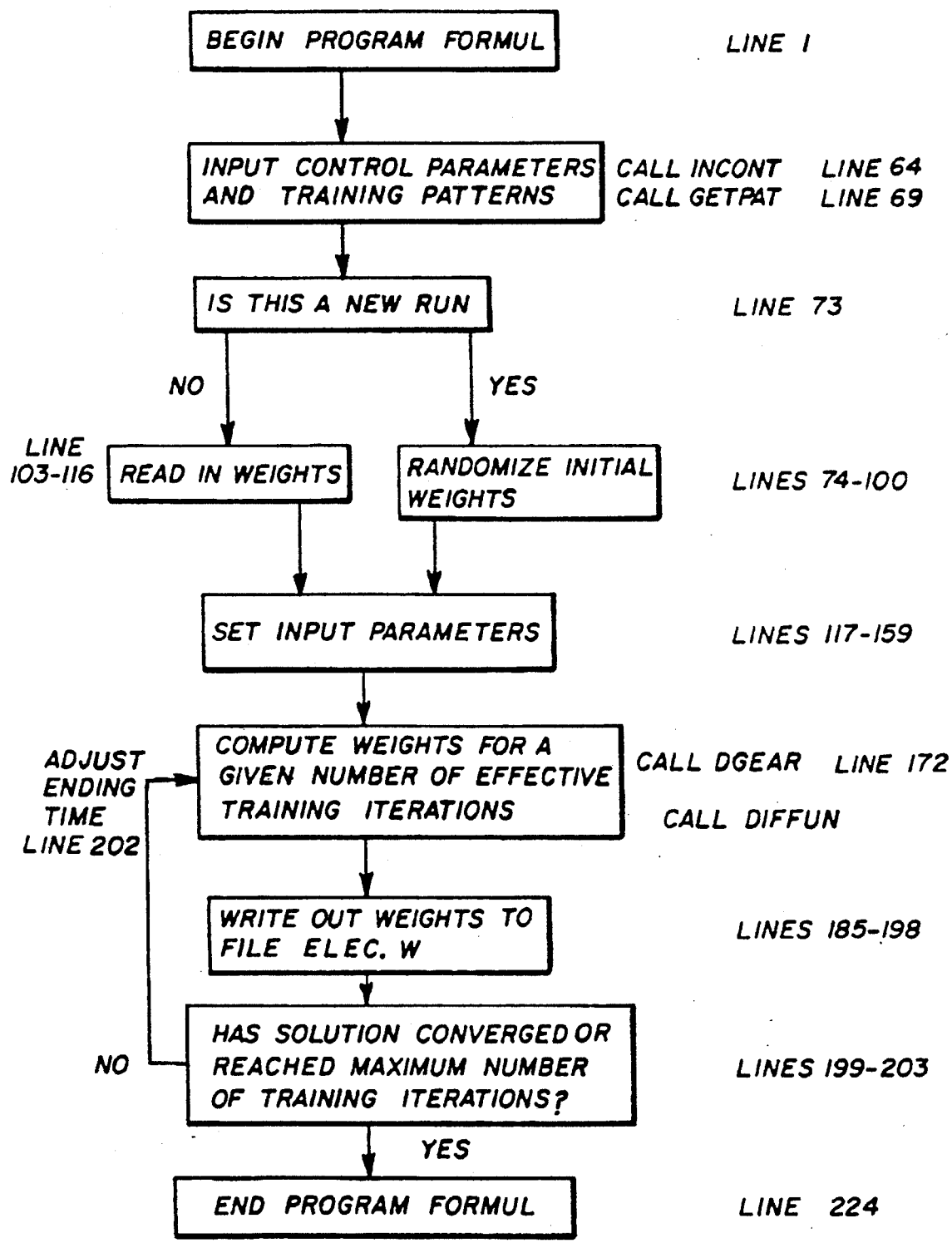
FIGS. 4 and 5 are flow diagrams of a program used to determine the interconnection weights and the thresholds between processing elements in the network shown in FIG. 3 in accordance with the present invention, specifically, with FIG. 4 being a flow diagram of the computer program to train a back propagation network using a stiff differential equation solver, and FIG. 5 being a flow diagram showing the interaction of the main program with the subroutine DGEAR: and, FIG. 6 shows the results of a distributed parallel processing network prediction of accept/reject versus training data for the specific example discussed herein.
Figure 5:
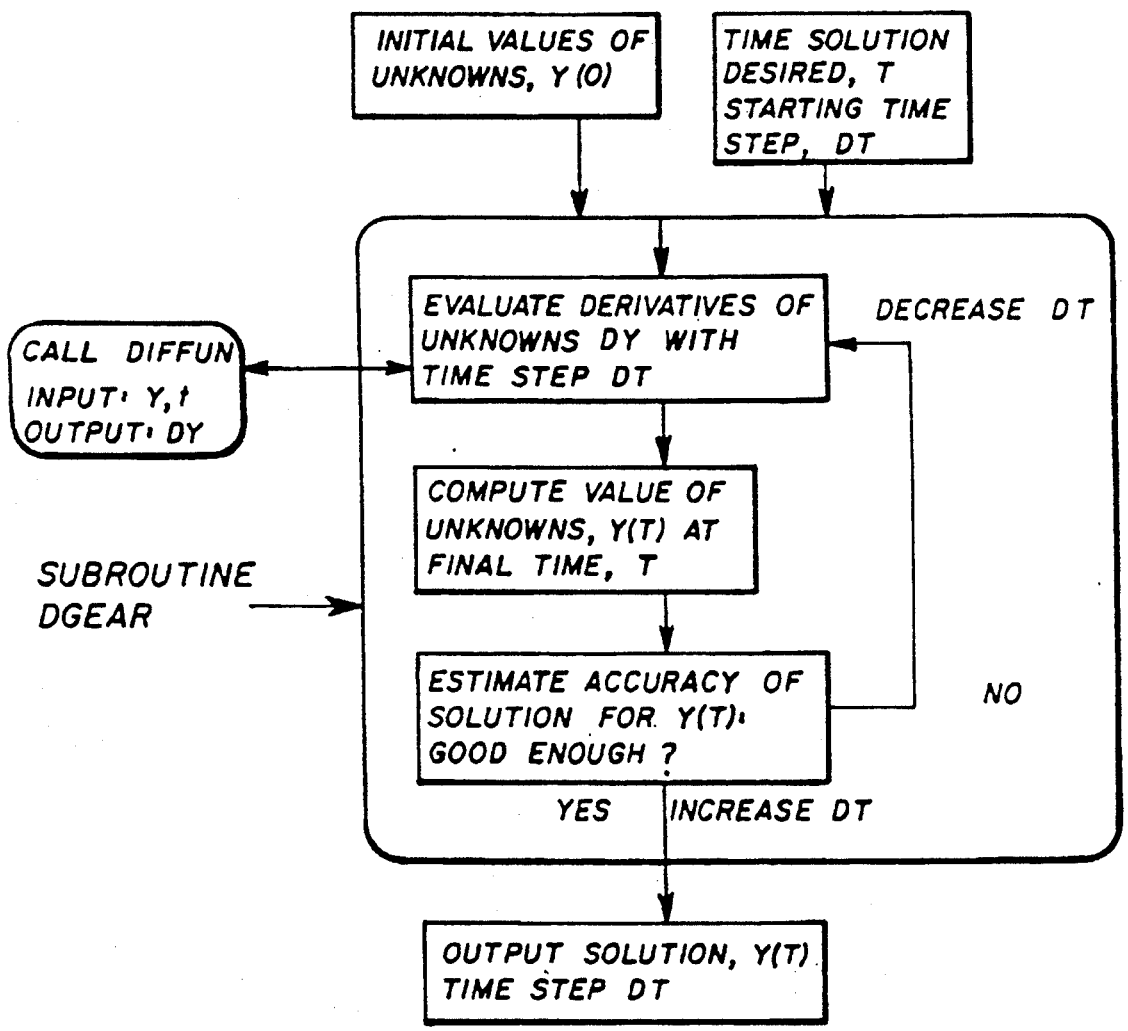

A listing of a program in Fortran-77 source language (pages A-1 to A-20, inclusive) whereby the program shown in the flow diagrams of FIGS. 4 and 5 is implemented is attached to and forms part of this application.

DETAILED DESCRIPTION OF THE INVENTION

Throughout the following detailed description similar reference numerals refer to similar elements in all figures of the drawings.

Figure 1:
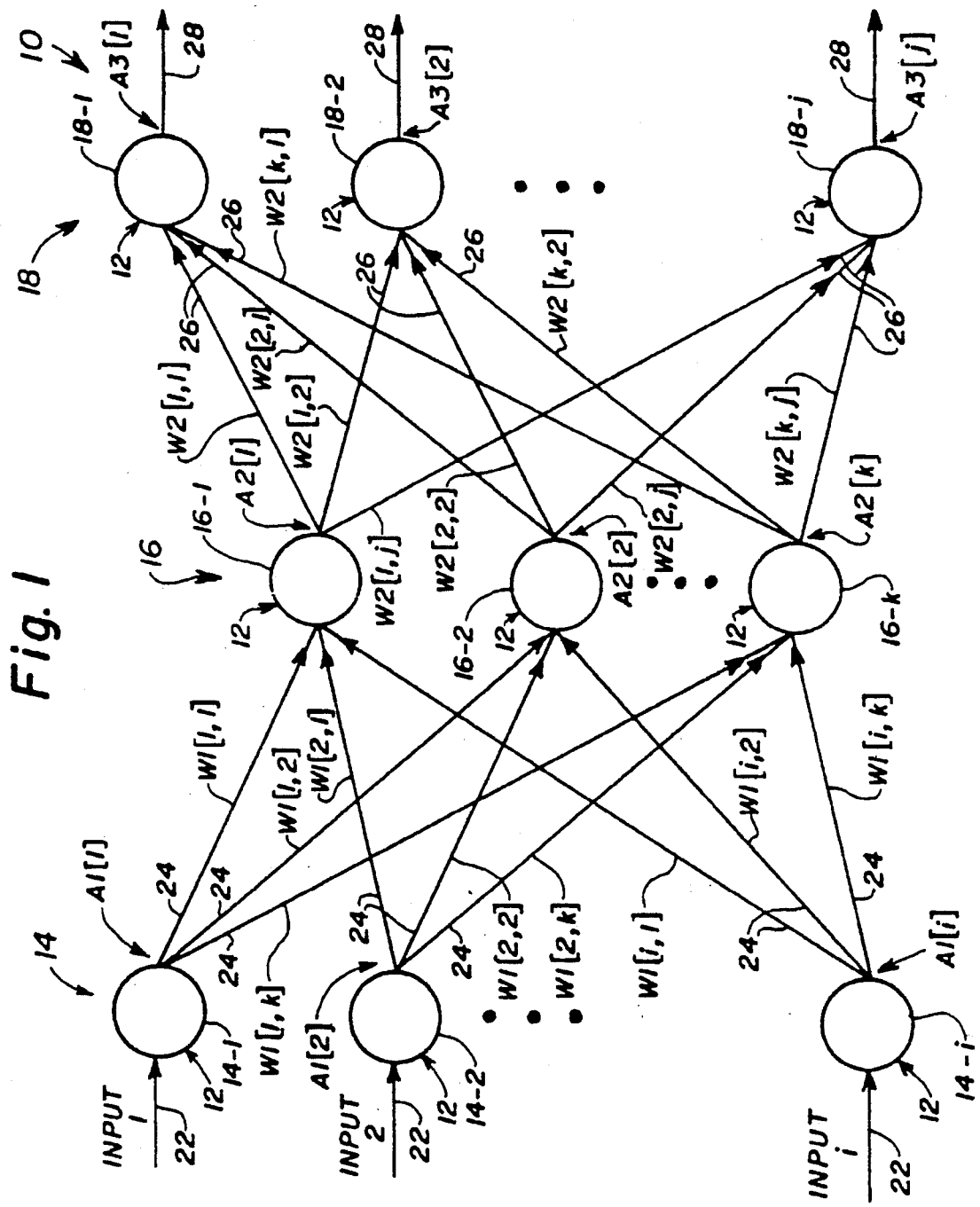
FIG. 1 is a stylized diagram of a generalized parallel distributed processing network in accordance with the present invention.

With reference to FIG. 1 shown in a stylized diagram of a generalized distributed parallel processing network generally indicated by reference character 10 in accordance with the present invention. The network 10 is configured as a back propagation network and comprises individual processing elements 12 configured into at least three layers 14, 16 and 18. Of these layers the layer 14 is termed the "input layer", the layer 18 the "output layer", and the intermediate layer 16 the "hidden layer". The processing network 10 is organized such that the input layer 14 contains a set of at least one to i processing elements, the hidden layer 16 has a set of at least one to k processing elements, and the output layer 18 has a set of at least one to j processing elements therein. When implementing the network an operator would specify the values i, k and j.

Figure 2:
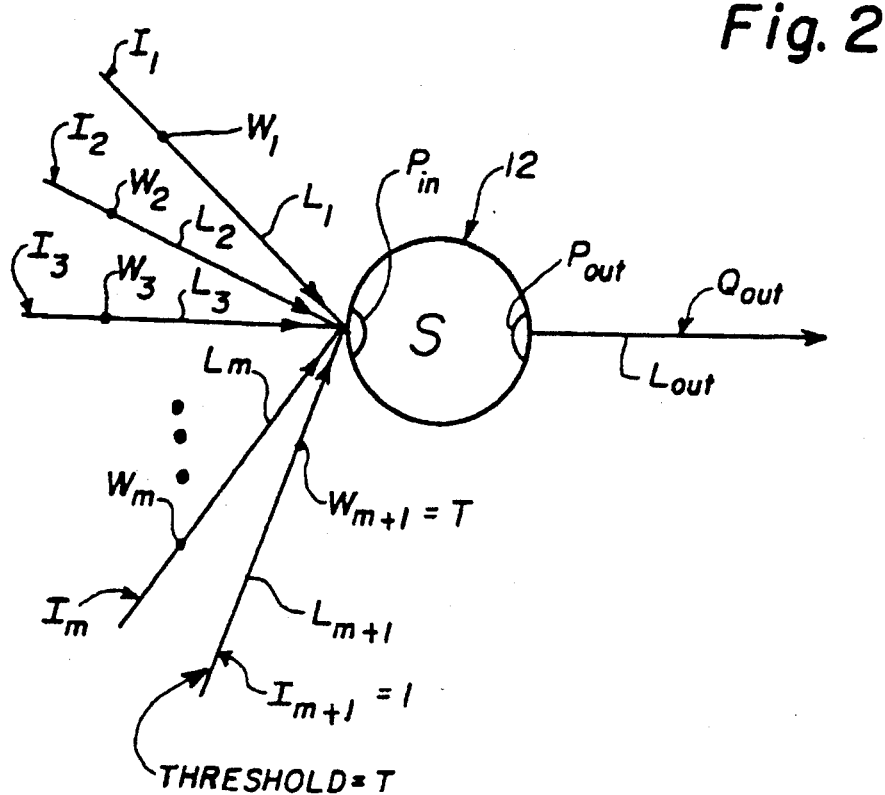
FIG. 2 is a generalized representation of a processing element used in the parallel distributed processing network of the present invention.

FIG. 2 is a generalized representation of a processing element 12 used throughout the network 10. Each processing element 12 has an input port $P_{in}$ and an output port $P_{out}$. The processing element is responsive to one or a plurality of excitation signal(s) $I_1$ though $I_m$ presented at the input port $P_{in}$ and is operative to produce an activation signal $Q_{out}$ carried on a line $L_{out}$ connected at the output port $P_{out}$. Each of the excitations $I_1$ though $I_m$ is connected to the input port $P_{in}$ of the element 12 over a respective line $L_1$ though $L_m$ that has a predetermined respective connection weight $W_1$ through $W_m$. The activation signal $Q_{out}$ that is produced on the line $L_{out}$ at the output port $P_{out}$ of the processing element 12 is, as a general rule, a function of the input signal $Q_{in}$ applied at the input port $P_{in}$. The input signal $Q_{in}$ is the summation, over all of the input lines to the processing element, of the inner product of the strength of a given excitation signal I and the connection weight W of the line L carrying that signal to the processing element, scaled by the squashing function S for that processing element. Symbolically, the activation signal $Q_{out}$ at the output port $P_{out}$ functionally related to the input signal $Q_{in}$ Signal on line $L_{out}=Q_{out}=S(Q_{in})$, (2)

wherein $$Q_{in} = \sum_{z=1}^{m} W[z]*I[z] + T, \text{ and} \quad (3)$$

where T is the threshold of the processing element 12. The threshold T can be considered as an additional weight from an input line (m+1) having a constant excitation signal of one (1), similar to the prior art. Throughout this application, the squashing function S takes the form of the sigmoid function, $$S=[1+exp(-Q_{in})]^{-1} \quad (4)$$

although any other desired monotonically nondecreasing squashing function may be used. If some other squashing function is used the detailed forms of the Equations (6), (7), (6a) and (7a) would, of course, be different from those set forth herein. However, the teachings of the present invention would have equal applicability thereto.

As may be seen from FIG. 1 each of the processing elements 14-1 through 14-i in the input layer 14 is connected to at least one of a predetermined number i of network input signals on a respective input line 22. Each of the lines 22 may have a predetermined weight associated therewith, similar to the situation discussed above in the case of the generalized processing element. It should be understood that a given processing element in the input layer 14 may be connected to more than one of the input signals, if desired. Each of the processing elements in the input layer 14 is operative, in a manner similar to that described above for the generalized processing element, to produce a respective activation signal A1[1] through A1[i] at the output port thereof.

The output port of each of the i processing elements in the input layer 14 is connected to at least one of the k processing elements 16-1 through 16-k in the intermediate layer 16 of processing elements by a respective line 24. In a typical case, the output port of each of the processing elements in the input layer 14 is connected to the input port of each of the processing elements in the intermediate layer 16. Each such interconnection line 24 has a connection weight W1[i,k] associated therewith.

In a fashion similar to that discussed above the processing elements in the intermediate layer 16 respond to the inputs applied thereto to produce an activation signal A2[k] at the output port thereof. In similar fashion, the output port of each of the k processing elements in the intermediate layer 16 is connected to the input port of at least one of the j processing elements in the output layer 18 of processing elements on a line 26. In the preferred case the output port of each element in the intermediate layer 16 is connected to the input port of one of the processing elements in the output layer 18. The lines 26 each have a connection weight W2[k,j] associated therewith.

The processing elements in the output layer 18 respond to the inputs thereto to produce an activation signal A3[j] at the output port thereof. These output signals are carried over respective output lines 28.

To train the network shown in the FIG. 1, a training set comprising an array containing from one to p sets of input signals is applied to the input lines 22 of the network 10. Associated with each of the applied inputs p is a predetermined desired value for the j-th output V[j,p] at the output 28 of the network 10. At any stage in the training of the network the error E to be minimized is the squared difference between the desired output V[j,p] and the actual output A3[j,p] when the input pattern p is presented to the network. Thus $$E = \sum_{p} \sum_{j} (V[j,p] - A3[j,p])^2 \quad (5)$$

If training of the network 10 is done using the conventional Generalized Delta Rule for the changes in weights given by the method of steepest descent (the term $\Delta W[gd]$ in Equation (1), above)

$$\Delta W2[k,j] = \sum_{p} A2[k,p]A3[j,p](1 - A3[j,p])(V[j,p] - A3[j,p]) \quad (6)$$

$$\Delta W1[i,k] = \sum_{p} A1[i,p]A2[k,p](1 - A2[k,p]) \times \quad (7)$$

$$\sum_{j} (V[j,p] - A3[j,p])A3[j,p](1 - A3[j,p])W2[k,j])$$

The sum p is over all training patterns and that of j over all output elements. As discussed earlier this training rule gives a finite-step change in the weights that corresponds approximately to the direction of steepest descent but it does not always converge. Despite initially fairly rapid training, training eventually becomes extremely slow and, as noted, can take thousands or even millions of presentations of the training set.

The present invention revolves upon the recognition that the training of a back propagation network using the conventional training rule described above is closely analogous to systems which are governed by stiff differential equations. Such systems are characterized by time constants which vary greatly in magnitude. In the case of a back propagation network this corresponds to the fact that some weights reach a near steady state value very rapidly while others change only very slowly. Moreover, sometimes a weight will remain unchanged for a large number of iterations and then suddenly change to another quasi-steady state value. This is a common occurrence for variables in a stiff differential system. Finally, prior art solution schemes for neural networks involve heuristics for adjusting the values of the constants eta and alpha (from Equation (1)) to try to obtain rapid but stable convergence.

The fundamental training concept of the back propagation network is to change the weights in accordance with the Generalized Delta Rule given by the method of steepest descent in such a way as to decrease the total squared error E. However, in accordance with the present invention, instead of the usual back propagation training schemes in which one thinks of the training as taking place in discrete steps labeled n, the training in accordance with the present invention is presumed to take place as a continuous time evolution of the weights W. However, it can be shown that the conventional discrete-step iterative scheme of Equation (1) is a fixed-time-step forward-Euler method for solving the underlying differential equations which is both inefficient and potentially unstable when applied to a system of stiff differential equations.

Thus, Equations (6) and (7) relating the various layers of the network can be written as differential equations $$d/dt\ W2[k,j] = \sum_p A2[k,p]A3[j,p](1 - A3[j,p])(V[j,p] - A3[j,p]) \quad (6a)$$

and $$d/dt\ W1[i,k] = \sum_p A1[i,p]A2[k,p](1 - A2[k,p]) \times$$

$$\sum_j (V[j,p] - A3[j,p])A3[j,p](1 - A3[j,p])W2[k,j]) \quad (7a)$$

Equations (6a) and (7a) are a set of coupled nonlinear ordinary differential equations for the continuous variables W1[i,k] and W2[k,j]. The initial conditions are small random weights. This system of equations may be integrated numerically to solve the equations, such that, as time increases, the weights converge to steady state values corresponding to those giving a local minimum least-squares prediction error. In the preferred instance, the equations are numerically solved using the stiff integration package DGEAR from the IMSL Library, sold by IMSL, Inc. Houston, Tex. The original version of the algorithm used in the package DGEAR is disclosed in Gear, C. W., *Numerical Initial Value Problems in Ordinary Differential Equations*, Prentice-Hall, Englewood Cliffs, N.J. (1971).

Because the differential Equations (6a), (7a) are formulated to decrease the mean square prediction error, in the direction of steepest descent the prediction error will always decrease. Convergence is absolute in all cases, with no need to adjust fitting parameters, such as eta or alpha, as in the prior art. As a further advantage, the solution of the equations and thus, the valuation of the weights, is achieved in a more rapid manner than in the prior art.

It should be understood that in accordance with the present invention the network 10 may be implemented in any of a variety of forms. In one aspect the network may be formed as the interconnection of discrete analog components in the manner indicated in the Figures. In an alternate implementation the network may be formed as an integrated circuit in which the layers of processing elements and the interconnection lines between them are integrated onto a suitable substrate by any appropriate integration process (in FIG. 1 the plane of the paper can be considered the substrate). In both these implementations the interconnection weights between the processing elements would preferably take the form of resistances in the connection lines. As another alternative an optical (holographic) implementation can be used. In the most preferred case the network is implemented using a programmed digital computer, either in the form of a mainframe (such as a CRAY X-MP), a mini computer (such as a Digital Equipment Corporation VAX) or in the form of one or more microcomputers or one or more boards having a microprocessor thereon.

It should be specifically understood that the terms in the claims "means for defining a first, input, set of from one to i processing elements", "means for defining a second, intermediate, set of from one to k processing elements", and "means for defining a third, output, set of from one to j processing elements", is not meant to imply that three discrete sets of electrical circuit structures are required to simultaneously coexist in order to implement the network. It should be appreciated that, as pointed out above, the distributed parallel processing network can be implemented using one or more digital computer(s) having a traditional von Nuemann architecture (of whatever size or power desired) in which each processing element in each layer is configured during one or more instruction cycles of the computer(s).

It should also be clearly understood that although the computation of the values of the connection weights W1, W2 for the back propagation network 10 is accomplished using a mathematic algorithm, such as the numerical integrator, the weights themselves are not mathematical in nature but represent physical connections between processing elements. Moreover, the network 10 as a whole is nonalgorithmic in nature. Stated alternatively, although a mathematical algorithm may be used to solve the underlying continuous differential equations and specify the values of the weights, the network having the processing elements connected by lines having those weights is not an algorithmic network.

EXAMPLE

An Inspection Problem

Figure 3:
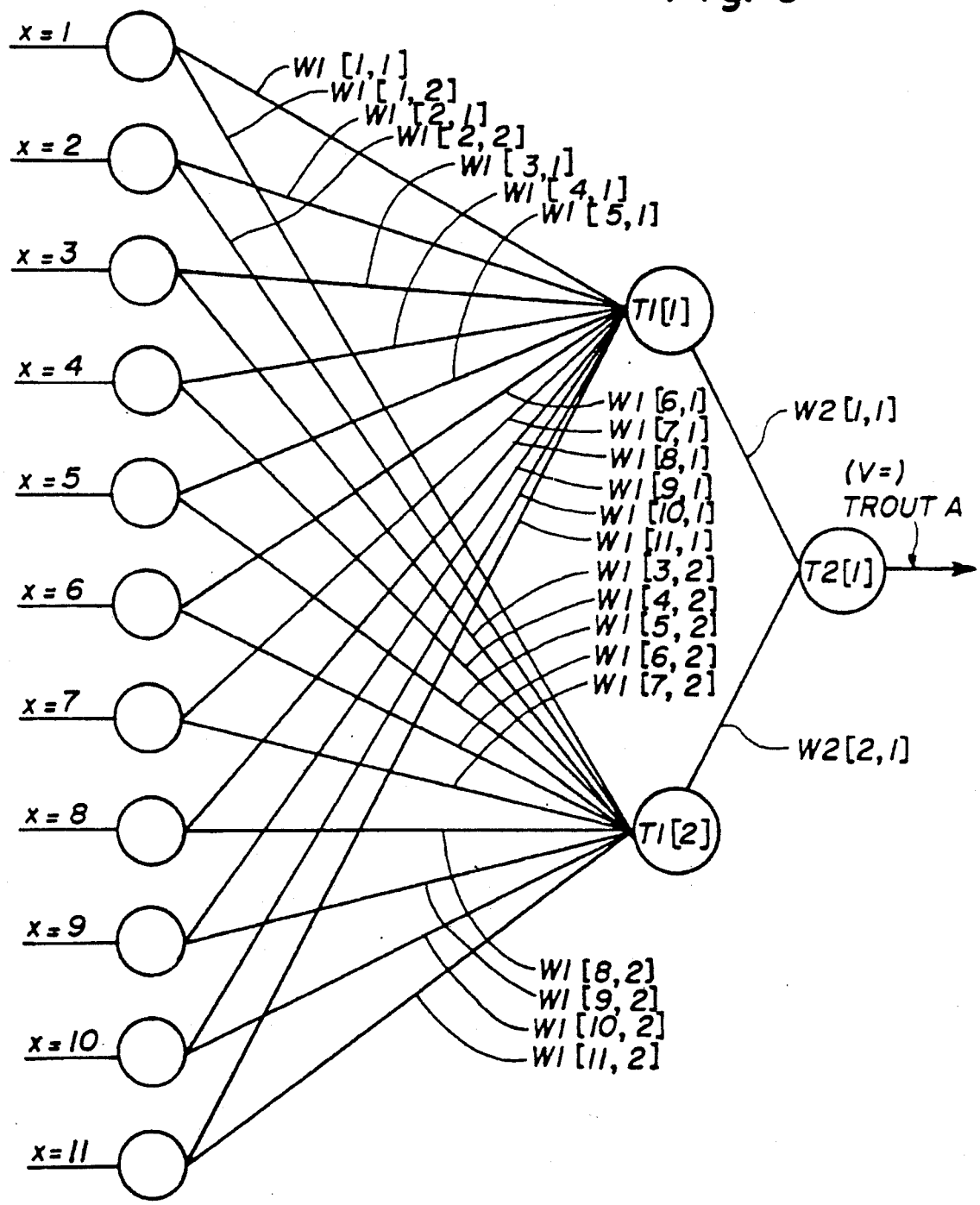
FIG. 3 is a diagram of a parallel distributed processing network in accordance with the present invention used in the specific example discussed herein.

A specific example of a parallel distributed processing network trained in accordance with the present invention is now presented. FIG. 3 is a schematic diagram of the parallel distributed processing network utilized in this example and configured to process information relative to a specific pattern recognition problem while FIGS. 4 and 5 are flow diagrams of a program used to determine the weights W1, W2 and the thresholds for the specific network shown in FIG. 3. The specific details of the problem involved the classification of electronic parts as either being accepted or rejected. The listing of a program, in Fortran-77 source language, for programming a CRAY X-MP supercomputer which effected the training of a back propagation network shown in FIG. 3 and determined the thresholds of the processing elements and the values of the weights W1 and W2 by solving (i.e., converging to a solution of) the underlying set of stiff differential equations associated with that network (in the form of Equations (6a) and (7a)) is attached as an Appendix to this application and is hereby made part thereof.

The parallel distributed processing network of the back propagation type as described heretofore is well suited for solving a wide variety of formulation, classification and pattern recognition problems. As discussed above, the network "learns" how to match a training set of inputs to outputs by adjusting the weights of the connections from the input processing elements to the intermediate processing elements and from the intermediate processing elements to the output processing elements.

The advantage of using such a network for formulation problems is that it is self-teaching. It is not necessary to specify an a priori functional form for the relationship between inputs and outputs, as in non-linear least squares statistical models. Also, the network is implicitly non-linear, giving a useful generalization over often applied linear techniques like multiple linear regression. Such networks do no require the discovery of an exhaustive set of formulation "rules", as in rule-based artificial intelligence (AI) systems. The network implicitly builds into its internal structure the rules and relationships that exist between inputs and outputs in the training data base. For this, given a sufficiently complete data base, the creation of a distributed parallel processing network model for formula prediction and pattern recognition can usually be completed more quickly and easily than statistical or rule-based models.

For a pattern recognition problem, the training data set determines the number of input and output processing elements that are used. A pre-processing step is normally used, scaling the inputs and outputs individually in both the training data set and the prediction data set to lie in the range 0.1 to 0.9. As will be developed, the training data set is used to determine the values of the thresholds and weights of the interconnections in accordance with the present invention. (It is again noted that the thresholds may be treated as weights.) The prediction data set is used to verify and to validate the operation of a network having the weights as determined in accordance with the present invention. When scaling, usually a linear scaling is done, with 0.1 corresponding to the lowest value of a particular variable in the set and 0.9 corresponding to the highest. In the example to be discussed, the data from eleven physical measurements of an electronic part was to be related to a visual inspector's classification into the categories REJECT [coded as 0.1] or ACCEPT [coded as 0.9]. The training set consisted of forty two (42) samples, of which thirty six (36) samples were accepted and six (6) rejected. The network of the example had eleven input processing elements (i=11), one for each of the physical measurements, two intermediate processing elements (k=2) and one output processing element (j=1), whose value designated acceptance or rejection.

In the present example, a user had only two choices to make in setting up the training of the network. First, the accuracy of convergence in the output data was specified. Two convergence criteria were used and the acceptance of either one caused the training to stop. First, if the root-mean-square (RMS) error in predicting the outputs was less than the user-specified tolerance TOLER (in scaled units), convergence was declared. Second, if none of the individual output errors exceeded three times the error tolerance (3*TOLER), the solution was also considered converged. For the classification of electronic parts example, an error tolerance of 0.01 was chosen, as shown in the listing of the input parameter file for training of the network (ELEC.PRM on page A-1 of the Appendix).

The second user-adjustable parameter was the number of internal or hidden processing elements (k) used in the network. For $n_i$ input elements, $n_k$ hidden elements, and $n_j$ output elements, the total number of adjustable weights and thresholds is given by the equation:

$$n_{total} = (n_i + 1)n_k + (n_k + 1)n_j \qquad (8)$$

If $n_{total}$ is small compared with the number of training samples, the network is "interpolative" in nature, the subtle variations in the input data cannot be mapped to output changes. If $n_{total}$ is large, the network approaches the "pattern recognition" mode in which it is memorizing each input pattern. If a few more internal elements are specified than needed, the network often tends to a solution in which several elements are either "on" or "off" for all the training patterns. These redundant elements can be removed from the network. If, on the other hand, too few hidden elements are specified, the network converges very slowly, and it tends to misclassify some of the members of the training set.

In the example here presented the training of the network and the determination of the thresholds and weights was implemented using a CRAY X-MP supercomputer operating in accordance with a program. The Cray Job Control Language (JCL) file ELEC.JOB given on page A-1 of the Appendix supervised the execution of the job on the CRAY X-MP supercomputer. The complete source listing of the Fortran-77 main program FORMUL, stored in file ELEC.CFT, is shown on lines 1 to 227 appearing on pages A-7 to A-11 of the Appendix.

The program input was read from two files, ELEC.PRM (on the input/output device identified in the listing as Fortran logical unit 15) and QSM.DAT (on the input/output device identified in the listing as Fortran logical unit 18). As may be seen from the listing of the file ELEC.PRM, page A-1 of the listing, there were eleven input nodes, one output node, and two hidden (internal) nodes. The RMS error tolerance (TOLER) for the training was specified as 0.01 (i.e., one percent), and the maximum number of effective training presentations (NMAX) was specified as one hundred thousand (100,000) thereby to provide an exit from the program. Any suitable error tolerance for a problem at hand may be specified, and any suitable number of training presentations may be selected.

The set of training data is set forth in the file QSM.DAT on page A-2 of the listing. The eleven inputs, labeled TRINA 1 through TRINA 11, to correspond to the variable name used in the program, for each of the forty two training patterns are shown one per line in the listing of the file QSM.DAT. On page A-3 of the listing are the forty two outputs TROUTA (also given the variable Y in the listing), with the values of 0.1 and 0.9 corresponding to REJECT and ACCEPT, respectively. The sets of input signals TRINA corresponds to the sets input signals INPUT(i) shown in FIG. 1 and to the inputs I shown in connection with FIG. 2.

Two files received the output from the main routine FORMUL. Information written to the input/output device identified in the listing as Fortran logical unit 6 appears in the output file NEURAL.CPR on page A-4 of the Appendix. The weights and thresholds are written to file ELEC.W on the input/output device identified in the listing as Fortran logical unit 28. The flow diagram for the training routine FORMUL is shown in FIG. 4. The major elements of the program are given in the boxes, with line numbers corresponding to those in the source listing of file ELEC.CFT shown along the right.

After variable and common declarations, the program FORMUL called subroutine INCONT and GETPAT to input the training parameters and the data, respectively. Subroutine INCONT (lines 446 to 459) read the information stored in file ELEC.PRM from the input/output device identified in the listing as Fortran logical unit 15. Subroutine GETPAT (lines 460 to 482) read the training patterns in the file QSM.DAT from Fortran logical unit 18, storing them in variables named TRINA (eleven inputs per training pattern) and TROUTA (one output per training pattern). In a new run (IRSTRT=0 in the file ELEC.PRM) the weights and thresholds were randomly assigned in lines 74 to 100. If the training was to be restarted (IRSTRT=1 in the file ELEC.PRM), lines 103 to 116 on page A-9 of the Appendix would read the file ELEC.W containing previously calculated weights and thresholds from the input/output device identified in the listing Fortran logical unit 29. In the example here discussed the training was started from random initial conditions, which along with control parameters for the subroutine DGEAR are set in lines 117 to 159 (page A-9).

Lines 160 to 205 in the main routine FORMUL were a loop in which the subroutine DGEAR was called repeatedly (lines 164–165), with increasing ending time TEND, which was initially one hundred. DGEAR solves the differential equations shown as Equations (6a), (7a) herein from time t (initially t=0) through time TEND, calling the subroutine DIFFUN (lines 228 to 435) which evaluated the right-hand side of Equations (6a) and (7a).

After DGEAR advanced the solution of the differential equations from t to TEND the weights and thresholds were written to file ELEC.W (the input/output device identified in the listing as Fortran logical unit 28) in lines 185 to 198. Some monitoring information was also written to file NEURAL.CPR (page A-4 of the listing) (the input/output device identified in the listing as Fortran logical unit 6) in lines 179 to 184. The time endpoint was then doubled (line 202) and, unless the time reached exceeded the maximum number of iterations (NMAX) specified in file ELEC.PRM, the loop was continued at line 160. The maximum program loop (lines 160 to 205) was also stopped if either of the two above discussed convergence criteria were met: a root-mean-squared prediction error in the outputs less than TOLER, or all of the prediction errors less than three times tolerance (3*TOLER). If convergence or NMAX was reached, program control was passed to line 206, and the final monitoring printout (lines 209 to 210) and writing of ELEC.W (lines 211 to 221) were done before the program stopped (line 223).

The interaction between the main routine FORMUL and the subroutine DGEAR is shown in the flow diagram of FIG. 5. On each call DGEAR began with the variables Y at the initial time and integrated Equations (6a) and (7a) through the time t by repeated calls to the subroutine DIFFUN which evaluated the right-hand side of these equations. DGEAR internally monitored the time step DT being used in the integration, increasing or decreasing it as necessary. It should be understood that since the program DGEAR is commercially available, the details thereof are depicted in the flow diagram in only a generalized fashion.

The subroutine DIFFUN (lines 228 to 435) took as input the values Y (representing the weights W1 and W2 and the thresholds THETA1 and THETA2 of the network being trained) and computed the instantaneous time rate of change of these values. $DY = dY/dt$. Again, it is noted that the thresholds were treated as weights. In lines 258 to 307 the input values Y were stored in the appropriate weight and threshold variables, and temporary storage variable for the weight changes are initialized. The DO loop in lines 308 to 390 evaluated the gradient-descent weight changes given in Equations (6a) and (7a). These quantities were stored in the appropriate locations of the output vector DY in lines 397 to 417.

The printout NEURAL.CPR on page A-4 of the listing shows the output for the example data set QSM.DAT (with explanatory material being added). The example had forty two training patterns and twenty seven adjustable weights and thresholds. The routine FORMUL converged to better than 0.01 RMS prediction error in a time of 25,600 effective training iterations. The FLOWTRACE (page A-4), specific to CRAY computer systems, show how many times each routine was called. The training weights and thresholds obtained are given in the printout of the file ELEC.W (page A-5). Because computers generated machine specific random number sequences, the details of the results shown in NEURAL.CPR and ELEC.W will not be the same on other computers.

The final listing provided with this example is the routine PREDCT.FOR, given on pages A-17 to A-20 of the Appendix. This is a VAX Fortran program which implements a distributed parallel processing network trained in accordance with the present invention. The routine PREDCT.FOR utilized the prediction set of data to verify and validate that a distributed parallel processing network in which the values of the weights between the input layer and the intermediate layer and between the intermediate layer and the output layer were adjusted in accordance with the steady state solution sets of the differentials equations as given in Equations (6a) and (7a) would accurately result in the appropriate classification of electronic parts as either REJECT or ACCEPT. The network was implemented on a Digital Equipment Corporation VAX.

The VAX, operating in accordance with the routine PREDCT.FOR, read the files ELEC.PRM, QSM.DAT and ELEC.W. It then used the weights found as the steady state solutions of the stiff differential equations set forth in Equations (6a) and (7a) to predict the outputs for the prediction set of patterns in QSM.DAT. The file ELEC.OUT shows the result of this computation for the weights and thresholds given in the file ELEC.W. As may be readily seen from inspection of the output Y[j] for the prediction set (the left-hand column on page A-6 of the Appendix) with the output produced by the network 10 in accordance with the invention as implemented by the VAX operating in accordance with the routine PREDCT.FOR, the network correctly classified each of the forty two (42) samples in the prediction set.

Figure 6:
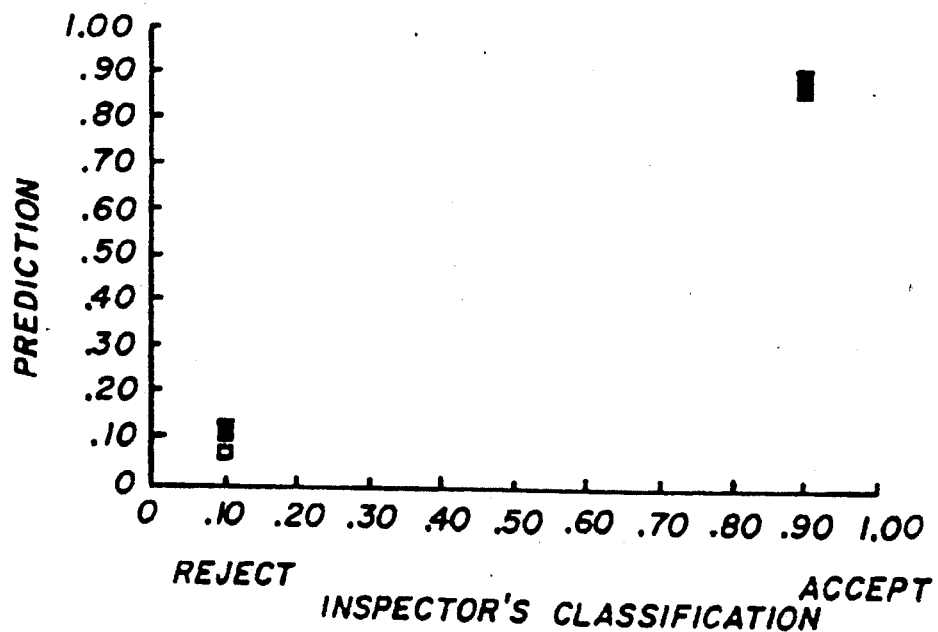

The accuracy of the network predictions listed in the file ELEC.OUT on page A-6 of the Appendix is graphically illustrated in FIG. 6. Since there were 42 training patterns, and from Equation (8) the number of adjustable weights and thresholds was 27, there are still fifteen (15) degrees of freedom. Nevertheless the network, with only two hidden elements, was able to correctly classify all 42 accept/reject decisions.

In the example discussed, as may be seen from the FLOWTRACE set forth on page A-4 of the Appendix, training of the network to a convergence having a tolerance of 0.01 required less than seven seconds of execution time (actually 6.741 seconds) on a CRAY X-MP/24 computer, using 25,600 time steps, well within NMAX. The actual solution of the Equations (6a) and (7a), which determines the values of the weights) required 6.629 seconds, and required execution of the routine DIFFUN 1505 times. In a traditional sequential-update scheme, where the weights are determined in accordance with the first term of the right hand side of Equation (1), training would have required at least 25,600 effective training presentations of all the training patterns to achieve this convergence, since the training rate eta is usually less than 1. That is, traditional training of the network would have required 25,600 iterations wherein $\Delta W[gd]$ would have been calculated. Stated alternatively, the number of iterations n in Equation (1) to train the network would have been 25,600 (with eta equal one and alpha equal zero). But, training done in accordance with the present invention resulted in one call to the subroutine DIFFUN, which is shown in the FLOWTRACE output as calling the routine DIFFUN 1505 times. For this example, therefore, the computational speedup due to using the training scheme in accordance with the invention is a factor of at least seventeen (17, 25,600 divided by 1505).

Moreover, the uniform convergence of the RMS prediction error is illustrated in the file NEURAL.CPR shown at Appendix page A-4, along with the rapid buildup of the computation step size being used. Toward the end of the training, in accordance with the present invention the network is learning at a rate hundreds of times faster than the traditional iteration scheme.

Distributed parallel processing network methods such as those outlined here can be a useful complement to traditional statistical methods, particularly when the underlying interactions are complex and nonlinear.

Compared with multiple least squares regression, the network can accommodate a more complex (i.e., nonlinear) relationship between inputs and outputs. The underlying principle of minimizing the least squares prediction error is the same, but the back propagation network is more general. The network is model-free, in contrast with nonlinear least squares fitting procedures, since no assumption is made about the inherent functional form relating inputs to outputs; the accuracy of the representation is limited only by the quality of the data, not by the adequacy of the model.

Those skilled in the art, having the benefit of the teachings of the present invention may impart numerous modifications thereto. It should be understood, however, that such modifications lie within the contemplation of the present invention, as defined by the appended claims.

© 1988 E.I. DuPont de Nemours & Co., Inc., All Rights Reserved

Appendix

Computer Source Code and Data Files For Training and Predicting With the Back Propagation Network Example      Electronics Accept/Reject Data

---

File ELEC.JOB -- Cray Job Control Language file for training the network

```
JOB,JN=NEURAL,T=200.
ACCOUNT,US=account,UPW=password.
*.************
FETCH,DN=SOURCE,TEXT='ELEC.CFT'.
FETCH,DN=FT15,TEXT='ELEC.PRM'.
FETCH,DN=FT29,TEXT='ELEC.W'.
FETCH,DN=FT18,TEXT='QSM.DAT'.
*.************
ACCESS,DN=DGEAR,PDN=DGEAR,OWN=APMATH,ID=APMATH.
*.************
CFT77,I=SOURCE,ON=FX,OFF=P,L=0.
SEGLDR,CMD='BIN=$BLD,DGEAR;ABS=BINJOB'.
*.************
DISPOSE,DEFER,DN=FT28,DC=PU,TEXT='ELEC.W'.
*.************
BINJOB.
/EOF.
```

---

File ELEC.PRM -- Input parameter file for training the network

```
11       iin       Input Nodes
1        iout      Output Nodes
2        intern    Internal Nodes
0.01     toler     Error Tolerance
100000   nmax      Maximum Number of Iterations
0        irstrt    Restart: 1 to continue job, 0 for new one
```

File QSM.DAT -- Input data file containing the training patterns

INPUTS - TRINA[z]

| z = | 1 | 2 | 3 | 4 | 5 | 6 | 7 | 8 | 9 | 10 | 11 |
|---|---|---|---|---|---|---|---|---|---|---|---|
| | 0.9000 | 0.9000 | 0.9000 | 0.1000 | 0.3313 | 0.7780 | 0.1832 | 0.3143 | 0.1000 | 0.1000 | 0.1000 |
| | 0.3695 | 0.3267 | 0.3269 | 0.4380 | 0.2655 | 0.7535 | 0.1708 | 0.7174 | 0.4616 | 0.5338 | 0.6009 |
| | 0.2032 | 0.2763 | 0.4269 | 0.2660 | 0.4546 | 0.8964 | 0.1683 | 0.6954 | 0.4918 | 0.5326 | 0.5876 |
| | 0.1695 | 0.5129 | 0.4602 | 0.6355 | 0.4429 | 0.4786 | 0.1783 | 0.4105 | 0.2397 | 0.4834 | 0.5403 |
| | 0.1716 | 0.5070 | 0.6731 | 0.7203 | 0.3057 | 0.6051 | 0.1000 | 0.1183 | 0.2479 | 0.4969 | 0.5220 |
| | 0.1737 | 0.3903 | 0.4574 | 0.6248 | 0.4325 | 0.7544 | 0.2963 | 0.2680 | 0.3589 | 0.3949 | 0.4747 |
| | 0.4105 | 0.4095 | 0.4787 | 0.5145 | 0.4616 | 0.7689 | 0.1882 | 0.4726 | 0.2192 | 0.3433 | 0.4032 |
| | 0.2537 | 0.1981 | 0.2296 | 0.7452 | 0.3383 | 0.6761 | 0.9000 | 0.3813 | 0.2808 | 0.3876 | 0.4439 |
| | 0.1305 | 0.3114 | 0.4444 | 0.6248 | 0.4726 | 0.8572 | 0.6416 | 0.3082 | 0.1589 | 0.3470 | 0.3717 |
| | 0.7516 | 0.2147 | 0.2046 | 0.7221 | 0.1956 | 0.5359 | 0.6255 | 0.5201 | 0.2844 | 0.3876 | 0.4830 |
| | 0.1000 | 0.2014 | 0.3556 | 0.8217 | 0.3410 | 0.7289 | 0.4056 | 0.8355 | 0.1671 | 0.3359 | 0.4124 |
| | 0.7484 | 0.5050 | 0.5759 | 0.3082 | 0.3646 | 0.7689 | 0.2068 | 0.3898 | 0.2370 | 0.3396 | 0.3700 |
| | 0.1400 | 0.2213 | 0.2565 | 0.6735 | 0.3320 | 0.7207 | 0.5932 | 0.8233 | 0.2849 | 0.3962 | 0.4423 |
| | 0.3558 | 0.2630 | 0.3046 | 0.5780 | 0.3071 | 0.6579 | 0.6304 | 0.6808 | 0.3082 | 0.3986 | 0.4531 |
| | 0.6242 | 0.2054 | 0.2500 | 0.4825 | 0.2628 | 0.6543 | 0.4143 | 0.4763 | 0.5260 | 0.5043 | 0.6333 |
| | 0.4558 | 0.3041 | 0.4361 | 0.4582 | 0.3230 | 0.7198 | 0.3186 | 0.4142 | 0.4808 | 0.4416 | 0.5544 |
| | 0.4358 | 0.3379 | 0.4185 | 0.5543 | 0.3355 | 0.6825 | 0.4168 | 0.4300 | 0.3164 | 0.4109 | 0.4713 |
| | 0.1316 | 0.1948 | 0.2583 | 0.6521 | 0.2835 | 0.6725 | 0.6354 | 0.5298 | 0.5000 | 0.4920 | 0.5876 |
| | 0.5474 | 0.2438 | 0.3676 | 0.3485 | 0.3085 | 0.8081 | 0.4727 | 0.7222 | 0.5397 | 0.3568 | 0.4198 |
| | 0.5000 | 0.2180 | 0.3037 | 0.4985 | 0.2475 | 0.7234 | 0.6180 | 0.7721 | 0.4849 | 0.3384 | 0.4016 |
| | 0.1021 | 0.1272 | 0.2000 | 0.4843 | 0.3874 | 0.9000 | 0.6342 | 0.9000 | 0.4918 | 0.3814 | 0.4805 |
| | 0.3347 | 0.2167 | 0.3157 | 0.6575 | 0.3639 | 0.7043 | 0.3149 | 0.5420 | 0.5699 | 0.3900 | 0.4506 |
| | 0.2305 | 0.2365 | 0.3963 | 0.4760 | 0.4110 | 0.8053 | 0.4491 | 0.5639 | 0.5671 | 0.4343 | 0.4082 |
| | 0.1547 | 0.1590 | 0.2269 | 0.7144 | 0.2690 | 0.7171 | 0.5012 | 0.6820 | 0.5658 | 0.4490 | 0.5087 |
| | 0.2842 | 0.1000 | 0.1000 | 0.5039 | 0.1533 | 0.6333 | 0.5335 | 0.7673 | 0.8384 | 0.6616 | 0.7164 |
| | 0.3537 | 0.1537 | 0.1954 | 0.5934 | 0.1443 | 0.5305 | 0.3944 | 0.3387 | 0.6014 | 0.9000 | 0.8543 |
| | 0.4937 | 0.1921 | 0.2306 | 0.6136 | 0.1769 | 0.6097 | 0.3311 | 0.4373 | 0.6808 | 0.5916 | 0.6607 |
| | 0.7147 | 0.3565 | 0.4343 | 0.5608 | 0.2427 | 0.6943 | 0.1149 | 0.3143 | 0.4438 | 0.4502 | 0.4830 |
| | 0.7295 | 0.2345 | 0.2259 | 0.6379 | 0.1242 | 0.5077 | 0.3832 | 0.2473 | 0.6438 | 0.5756 | 0.6749 |
| | 0.1400 | 0.1331 | 0.1991 | 0.9000 | 0.2184 | 0.5669 | 0.8255 | 0.4495 | 0.4466 | 0.4576 | 0.5245 |
| | 0.3737 | 0.1040 | 0.1213 | 0.8164 | 0.1000 | 0.4641 | 0.5957 | 0.4409 | 0.7151 | 0.5608 | 0.7272 |
| | 0.5621 | 0.2505 | 0.4333 | 0.6782 | 0.2932 | 0.6415 | 0.3571 | 0.4726 | 0.3260 | 0.3814 | 0.4082 |
| | 0.2747 | 0.1968 | 0.2120 | 0.5685 | 0.1284 | 0.6279 | 0.2143 | 0.2936 | 0.8644 | 0.7624 | 0.9000 |
| | 0.7474 | 0.2763 | 0.2991 | 0.7073 | 0.2018 | 0.6006 | 0.2938 | 0.2632 | 0.4562 | 0.4637 | 0.5062 |
| | 0.7400 | 0.1994 | 0.1361 | 0.6408 | 0.1519 | 0.4449 | 0.4528 | 0.3740 | 0.6110 | 0.6137 | 0.6724 |
| | 0.3558 | 0.3141 | 0.3093 | 0.5703 | 0.1319 | 0.6288 | 0.1634 | 0.2973 | 0.6205 | 0.7034 | 0.8119 |
| | 0.3758 | 0.3247 | 0.4056 | 0.4102 | 0.1949 | 0.5833 | 0.2602 | 0.3606 | 0.9000 | 0.5707 | 0.6981 |
| | 0.3821 | 0.2531 | 0.2852 | 0.5299 | 0.1229 | 0.5086 | 0.4478 | 0.4044 | 0.8315 | 0.6038 | 0.7413 |
| | 0.4053 | 0.3671 | 0.4426 | 0.4078 | 0.2087 | 0.6634 | 0.2764 | 0.4202 | 0.7274 | 0.5289 | 0.5827 |
| | 0.5579 | 0.3638 | 0.4704 | 0.5341 | 0.1838 | 0.5942 | 0.4478 | 0.3314 | 0.5247 | 0.4244 | 0.4979 |
| | 0.2200 | 0.4844 | 0.7176 | 0.2299 | 0.9000 | 0.1000 | 0.2938 | 0.3496 | 0.5151 | 0.4465 | 0.4929 |
| | 0.4653 | 0.2531 | 0.2759 | 0.5489 | 0.2122 | 0.6151 | 0.2652 | 0.2875 | 0.6740 | 0.6395 | 0.7255 |

OUTPUT

TROUTA
| | | |
|---|---|---|
| 0.1 | | 0.9 |
| 0.9 | | 0.9 |
| 0.9 | | 0.9 |
| 0.9 | | 0.9 |
| 0.9 | 5 | 0.9 |
| 0.9 | | 0.9 |
| 0.9 | | 0.9 |
| 0.9 | | 0.9 |
| 0.9 | | 0.9 |
| 0.9 | 10 | 0.9 |
| 0.9 | | 0.1 |
| 0.9 | | 0.1 |
| 0.9 | | 0.9 |
| 0.1 | | 0.9 |
| 0.1 | 15 | 0.9 |
| 0.1 | | 0.9 |
| 0.9 | | 0.9 |
| 0.9 | | 0.9 |
| 0.9 | | 0.9 |
| 0.9 | 20 | 0.9 |
| 0.9 | | 0.9 |
| 0.9 | | 0.9 |
| 0.9 | | 0.9 |
| 0.9 | | 0.9 |

---

File NEURAL.CPR -- Cray Unit 6 Output File from training the network

There are  42 training patterns ...

NEQ = 27

| Number of Iteration Time Steps | Fraction of Wrong (>3*TOLER) Predictions | RMS error of Predictions | Calculation Step Size |
|---|---|---|---|
| 100 | 0.64 | 0.2195 | 4.6684 |
| 200 | 0.74 | 0.1837 | 4.6109 |
| 400 | 0.71 | 0.0625 | 13.0046 |
| 800 | 0.57 | 0.0445 | 46.6650 |
| 1600 | 0.29 | 0.0317 | 88.7387 |
| 3200 | 0.10 | 0.0227 | 204.0758 |
| 6400 | 0.02 | 0.0185 | 398.0878 |
| 12800 | 0.02 | 0.0167 | 866.8426 |
| 25600 | 0.02 | 0.0097 | 207.7799 |

-- Program exited after   25600  iterations --

F L O W T R A C E  --  Alphabetized summary

| 0 | Routine | Time executing | Called | Average T |
|---|---|---|---|---|
| 4 | DIFFUN | 6.629 ( 98.34%) | 1505 | 0.004 |
| 1 | FORMUL | 0.099 ( 1.47%) | 1 | 0.099 |
| 3 | GETPAT | 0.012 ( 0.18%) | 1 | 0.012 |
| 2 | INCONT | >     ( 0.00%) | 1 | > |

* * * TOTAL    6.741    1508 Total calls

File ELEC.W -- Output weights (W1, W2) and thresholds (T1, T2) obtained from training the network with the program ELEC.CFT

| | | | |
|---|---|---|---|
| -11.86993003578, | -5.222510243583, | 6.4344953779246E-2, | 2.767920934564, |
| W1[1,1] | W1[2,1] | W1[3,1] | W1[4,1] |
| 6.238030600573, | 1.854656351139, | -1.579631795805, | -4.665320753261, |
| W1[5,1] | W1[6,1] | W1[7,1] | W1[8,1] |
| 13.15290552942, | 5.746987089318, | 1.168009361619 | |
| W1[9,1] | W1[10,1] | W1[11,1] | |
| -3.037580430436, | -5.935484122369, | -2.374570934197, | 14.90463454373, |
| W1[1,2] | W1[2,2] | W1[3,2] | W1[4,2] |
| -7.01678972524, | -8.651354761989, | -3.654348239141, | 2.745646870826, |
| W1[5,2] | W1[6,2] | W[7,2] | W1[8,2] |
| -5.34033881607, | -3.994632267876, | 4.475606260245 | |
| W1[9,2] | W1[10,2] | W1[11,2] | |
| 4.958350644916, | -12.68949883147 | | |
| W2[1,1] | W2[2,1] | | |
| 1.685189460189, | -2.246144696703 | | |
| T1[1] | T1[2] | | |
| -2.675625898836 | | | |
| T2[1] | | | |

File ELEC.OUT -- Output file from PREDCT.FOR giving training outputs and the neural net predictions based on trained weights

| Training Data (Output) Y[j] | Neural Net Predicted Output A3[j] | Training Data (Output) Y[j] | Neural Net Predicted Output A3[j] |
|---|---|---|---|
| 0.1000000 | 6.4447232E-02 | 0.9000000 | 0.9055984 |
| 0.9000000 | 0.9062849 | 0.9000000 | 0.9074043 |
| 0.9000000 | 0.9074113 | 0.9000000 | 0.8893026 |
| 0.9000000 | 0.8994913 | 0.9000000 | 0.9061695 |
| 0.9000000 | 0.9001551 | 0.9000000 | 0.8996523 |
| 0.9000000 | 0.9070860 | 0.9000000 | 0.9043082 |
| 0.9000000 | 0.8907330 | 0.9000000 | 0.8868119 |
| 0.9000000 | 0.9003530 | 0.9000000 | 0.9024009 |
| 0.9000000 | 0.9068769 | 0.1000000 | 9.9780612E-02 |
| 0.1000000 | 0.1095745 | 0.1000000 | 0.1000709 |
| 0.1000000 | 0.1009571 | 0.9000000 | 0.8750660 |
| 0.1000000 | 0.1166618 | 0.9000000 | 0.9053038 |
| 0.9000000 | 0.8882428 | 0.9000000 | 0.8850744 |
| 0.9000000 | 0.8932497 | 0.9000000 | 0.8950629 |
| 0.9000000 | 0.9046183 | 0.9000000 | 0.9049202 |
| 0.9000000 | 0.9066994 | 0.9000000 | 0.9074057 |
| 0.9000000 | 0.8999134 | 0.9000000 | 0.9064683 |
| 0.9000000 | 0.9024006 | 0.9000000 | 0.9073897 |
| 0.9000000 | 0.8983737 | 0.9000000 | 0.9029703 |
| 0.9000000 | 0.8878288 | 0.9000000 | 0.9074269 |
| 0.9000000 | 0.9072540 | 0.9000000 | 0.9068525 |

File ELEC.CFT -- Cray FORTRAN Source Code for training the network

```
1              program formul
2      c
3      c              Implementation of Neural Net Algorithm
4      c              to solve the FORMULATION Problem:
5      c
6      c              Predict Fail/Unknown/Pass from 11 Measurements
7      c
8      c              Uses 3-Layer Perceptron Model with Sigmoidal
9      c                     Response Function
10     c
11     c
12     c              Solve the Network as a System of STIFF ODE's
13     c
14     c              iin    = ?? -- Input Nodes (continuous: range 0 to 1)
15     c              intern = ?? -- (INTERNAL Nodes: continuous, 0 to 1)
16     c              iout   = ?? -- Output Nodes (continuous: range 0 or 1)
17     c
18     c
19     c              INPUT: Training Patterns: Spectrum & Formula
20     c
21     c              OUTPUT:
22     c
23     c                     Errors in Predicted Formula
24     c                     Weights : RMS changed
25     c
26     c              PARAMETERS
27     c
28     c                     INMAX  = max. number of input nodes
29     c                     INTRNM = max. number of INTERNAL nodes
30     c                     ioutmx = max. number of output nodes
31     c
32             parameter (INMAX = 11)
33             parameter (INTRNM = 10)
34             parameter (ioutmx = 1)
35             parameter (MAXPAT = 50)
36     c
37             PARAMETER (NYMAX = INMAX*INTRNM+ ioutmx*INTRNM +
38         1                      intrnm + ioutmx)
39     c
40             parameter (nmeth = 6*nymax)
41             parameter (nmiter = nymax*(nymax+1))
42             parameter (nwk = 4*nymax+nmeth+nmiter)
43     C
44             DIMENSION W1(INMAX,INTRNM)
45             DIMENSION W2(INTRNM,ioutmx)
46             DIMENSION trina(maxpat,inmax), trouta(maxpat,ioutmx)
47             DIMENSION theta1(intrnm), theta2(ioutmx)
48             DIMENSION TRIN(INMAX), TROUT(ioutmx)
49             DIMENSION y1(INTRNM), y2(ioutmx)
50     c
51             COMMON/VARS/W1,W2,TRINA,TROUTA,TRIN,TROUT,
52         1              iin,iout,intern,toler,NDIM,ITRAIN,
53         2              theta1, theta2, iwrong, wrong, sigerr
54     c
55             DIMENSION Y(NYMAX)
56             DIMENSION DY(NYMAX)
57             dimension iwk(nymax)
58             DIMENSION work(nwk)
59     c
60             EXTERNAL DIFFUN, fcnj
61     c
62     c              input control parameters
63     c
64             call incont (iin, iout, intern, toler, nmax, irstrt)
65     c
```

```
66    c                    input training patterns
67    c
68             ndim = maxpat
69             call getpat (iin, iout, ndim, trina, trouta, itrain)
70    c
71    c                    initialize the W matrix
72    c
73             if (irstrt.eq.1) go to 3200
74    c
75    c            NEW RUN -- randomize initial weights
76    c
77             fn = 0.3
78    c
79             do 10 i=1,iin
80             do 10 j=1,intern
81             w1(i,j) = fn*(2.0*RANF()-1.0)
82    c
83             if (i.eq.1) then
84                    theta1(j) = fn*(2.0*RANF()-1.0)
85             end if
86    c
87       10   continue
88    c
89             do 12 i=1,intern
90             do 12 j=1,iout
91             w2(i,j) = fn*(2.0*RANF()-1.0)
92    c
93             if (i.eq.1) then
94                    theta2(j) = fn*(2.0*RANF()-1.0)
95             end if
96    c
97       12   continue
98    c
99             go to 3299
100   c
101     3200  continue
102   c
103   c            RESTART JOB -- read in the w matrices
104   c
105             do 3330 j=1,intern
106             read (29,*) (w1(i,j),i=1,iin)
107     3330  continue
108             do 3332 j=1,iout
109             read (29,*) (w2(i,j),i=1,intern)
110     3332  continue
111             read (29,*) (theta1(i),i=1,intern)
112             read (29,*) (theta2(i),i=1,iout)
113   c
114             rewind (29)
115   c
116     3299  continue
117   c
118   c                  step through all training iterations
119   c
120             NEQ1 = iin*intern
121             NEQ2 = intern*iout
122             NEQ3 = intern + iout
123             NEQ  = NEQ1+NEQ2+NEQ3
124             PRINT *,'1   NEQ = ',NEQ
125   c
126   c                  Put INITIAL CONDITIONS into Y
127   c
128             IO = 0
129             DO 13 I=1,iin
130             DO 13 J=1,intern
131             IO=IO+1
132             Y(IO) = W1(I,J)
133       13   CONTINUE
```

```
134              DO 14 I=1,intern
135              DO 14 J=1,iout
136              IO = IO+1
137              Y(IO) = W2(I,J)
138       14     CONTINUE
139              do 15 i=1,intern
140              io = io+1
141              y(io) = theta1(i)
142       15     continue
143              do 16 i=1,iout
144              io = io+1
145              y(io) = theta2(i)
146       16     continue
147      C
148      c                Control Parameters for DGEAR
149      c
150              EPS   = 1.0E-4
151              meth  = 2
152              miter = 2
153              index = 1
154      c
155              T = 0.0
156              TPRINT = 100.0
157              TMAX = float(nmax)
158              tstep = 1.0E-3
159      c
160       1000   CONTINUE
161      c
162              TEND = TPRINT
163      c-------
164              call dgear (neq, diffun, fcnj, t, tstep, y, tend, eps,
165         1                meth, miter, index, iwk, work, ier)
166      c-------
167              IF(IER.GT.100) THEN
168                 PRINT *,' ***** DGEAR Error IER = ',IER,' *****'
169                 GO TO 1999
170              END IF
171      c
172              CALL DIFFUN(NEQ,T,Y,DY)
173      c
174              DELSQ = 0.
175      c
176              DO 820 IO=1,NEQ
177              DELSQ = DELSQ + DY(IO)*DY(IO)
178       820    CONTINUE
179      c
180      c           ... print stats
181      c
182              write (6,240) int(T+0.5), wrong, sigerr, TSTEP,
183         1                  W1(1,1), W2(1,1)
184       240    format (1X,I6,1X,F6.2,1X,F8.4,1X,F12.4,3(2x,E11.4))
185      c
186      c           write out the present w matrices
187      c
188              do 3230 j=1,intern
189              write (28,*) (w1(i,j),i=1,iin)
190       3230   continue
191              do 3232 j=1,iout
192              write (28,*) (w2(i,j),i=1,intern)
193       3232   continue
194              write (28,*) (theta1(i),i=1,intern)
195              write (28,*) (theta2(i),i=1,iout)
196      c
197              rewind (28)
198      c
199              if (iwrong.eq.0) go to 1999
200              if (sigerr.lt.toler) go to 1999
201      c
```

```
202              tprint = 2.0*tprint
203              IF(T.GT.TMAX) go to 1999
204              GO TO 1000
205     c
206     1999     continue
207     c
208              nmax = int(t+0.5)
209              write (6,2254) nmax
210     2254     format ('   -- Program exited after ',i7,'  iterations --')
211     c
212     c            write out final w matrices
213     c
214              do 1230 j=1,intern
215              write (28,*) (w1(i,j),i=1,iin)
216     1230     continue
217              do 1232 j=1,iout
218              write (28,*) (w2(i,j),i=1,intern)
219     1232     continue
220              write (28,*) (theta1(i),i=1,intern)
221              write (28,*) (theta2(i),i=1,iout)
222     c
223              stop
224              end
225     c
226     c
227     c
228              SUBROUTINE DIFFUN(NEQ,T,Y,DY)
229     c
230     c
231     c
232              parameter (INMAX = 11)
233              parameter (INTRNM = 10)
234              parameter (ioutmx = 1)
235              parameter (MAXPAT = 50)
236     c
237              DIMENSION W1(INMAX,INTRNM)
238              DIMENSION W2(INTRNM,ioutmx)
239              DIMENSION w1del(inmax,intrnm), w2del(intrnm,ioutmx)
240              DIMENSION trina(maxpat,inmax), trouta(maxpat,ioutmx)
241              DIMENSION TRIN(INMAX), TROUT(ioutmx)
242              DIMENSION y1(INTRNM), y2(ioutmx)
243              DIMENSION theta1(intrnm), theta2(ioutmx)
244              DIMENSION del2(ioutmx), del1(intrnm)
245              DIMENSION dd1(intrnm), dd2(ioutmx)
246     c
247              COMMON/VARS/W1,W2,TRINA,TROUTA,TRIN,TROUT,
248          1           iin,iout,intern,toler,NDIM,ITRAIN,
249          2           theta1, theta2, iwrong, wrong, sigerr
250     c
251              DIMENSION Y(1), DY(1)
252     c
253     c            Make INHERE = 0 for more diagnostic printout
254     c
255              DATA INHERE/1/
256     c
257              wrerr = 3.0*toler
258     c
259              IO = 0
260              DO 13 I=1,iin
261              DO 13 J=1,intern
262              IO=IO+1
263              W1(I,J) = Y(IO)
264     13       CONTINUE
265     c
266              DO 14 I=1,intern
267              DO 14 J=1,iout
268              IO=IO+1
269              W2(I,J) = Y(IO)
270     14       CONTINUE
```

```
271     c
272             do 15 i=1,intern
273             io = io+1
274             theta1(i) = y(io)
275     15      continue
276     c
277             do 16 i=1,iout
278             io = io+1
279             theta2(i) = y(io)
280     16      continue
281     c
282     c
283     c               Zero out the Delta-W matrices
284     c
285             do 810 i=1,iin
286             do 810 j=1,intern
287             w1del(i,j) = 0.0
288     810     continue
289     c
290             do 812 i=1,intern
291             do 812 j=1,iout
292             w2del(i,j) = 0.0
293     812     continue
294     c
295             do 814 i=1,intern
296             del1(i) = 0.0
297     814     continue
298     c
299             do 816 i=1,iout
300             del2(i) = 0.0
301     816     continue
302     c
303     c               ... step through the training patterns
304     c
305             iwrong = 0
306             sigerr = 0.0
307     c
308             do 2000 ipat = 1,itrain
309     c
310             do 2010 i=1,iin
311             trin(i) = trina(ipat,i)
312     2010    continue
313             do 2020 j=1,iout
314             trout(j) = trouta(ipat,j)
315     2020    continue
                    IF(INHERE.EQ.0) THEN
                        PRINT *,' TRIN  ', IPAT,(TRIN(I),I=1,iin)
                        PRINT *,' TROUT ', IPAT,(TROUT(J),J=1,iout)
                    END IF
320     c
321     c               ... compute output for this input
322     c                       at INTERNAL nodes
323     c
324             do 218 j=1,intern
325             sum = 0.0
326     c
327                     do 216 i=1,iin
328                     sum = sum + trin(i)*w1(i,j)
329     216             continue
330     c
331     c               ... perform sigmoid function on "arg"
332     c
333             arg = -(sum+theta1(j))
334             y1(j) = 1.0/(1.0+exp(arg))
335     218     continue
                    IF(INHERE.EQ.0) PRINT *,' Y1 ',(Y1(J),J=1,intern)
337     c
338     c               ... compute output for this input
339     c                       at OUTPUT nodes
```

```
340     c
341             do 215 j=1,iout
342             sum = 0.0
343     c
344                 do 210 i=1,intern
345                 sum = sum + y1(i)*w2(i,j)
346     210         continue
347     c           ... perform sigmoid function on "arg"
348     c
349             arg = -(sum+theta2(j))
350             y2(j) = 1.0/(1.0+exp(arg))
351     c
352             derr = abs(y2(j)-trout(j))
353             if (derr.gt.wrerr) iwrong = iwrong + 1
354             sigerr = sigerr + derr**2
355     c
356     215     continue
357             IF(INHERE.EQ.0) PRINT *,' Y2 ',(Y1(J),J=1,iout)
358     c
359     c           ... from INTERNAL nodes to OUTPUT nodes
360     c
361             do 220 i=1,intern
362             do 220 j=1,iout
363             dd2(j) = (trout(j)-y2(j))*y2(j)*(1.0-y2(j))
364             w2del(i,j) = w2del(i,j) + dd2(j)*y1(i)
365     220     continue
366     c
367             do 221 j=1,iout
368             del2(j) = del2(j) + dd2(j)
369     221     continue
370     c
371     c           ... from INPUT nodes to INTERNAL nodes
372     c
373             do 222 i=1,iin
374             do 222 j=1,intern
375             sum = 0.0
376     c
377                 do 224 k = 1,iout
378                 sum = sum + dd2(k)*w2(j,k)
379     224         continue
380     c
381             dd1(j) = y1(j)*(1.0-y1(j))*sum
382     c
383             w1del(i,j) = w1del(i,j) + dd1(j)*trin(i)
384     222     continue
385     c
386             do 223 j=1,intern
387             del1(j) = del1(j) + dd1(j)
388     223     continue
389     c
390     2000    continue
391     c
392     c           ... get stats
393     c
394             wrong = float(iwrong)/float(itrain)
395             total = itrain*iout
396             sigerr = sqrt(sigerr/total)
397     c
398             IO = 0
399             DO 715 I=1,iin
400             DO 715 J=1,intern
401             IO=IO+1
402             DY(IO) = W1DEL(I,J)
403     715     CONTINUE
404             DO 716 I=1,intern
405             DO 716 J=1,iout
406             IO = IO+1
407             DY(IO) = W2DEL(I,J)
408     716     CONTINUE
```

```
409             do 115 i=1,intern
410             io = io+1
411             dy(io) = del1(i)
412    115      continue
413             do 116 i=1,iout
414             io = io+1
415             dy(io) = del2(i)
416    116      continue
417   c
418             IF(INHERE.EQ.0) THEN
419                DO 17 I=1,iin
420                PRINT *,' W1Del(I,J): I = ',I,(W1DEL(I,J),J=1,intern)
421    17          CONTINUE
422                do 1816 i=1,intern
423                print *,' W2Del(I,J): I = ',I,(w2del(i,j),j=1,iout)
424    1816       continue
425                print *,' ThDel1 : ',(del1(j),j=1,intern)
426                print *,' ThDel2 : ',(del2(j),j=1,iout)
427                INHERE=1
428             END IF
429   c
430
431             RETURN
432             END
433   c
434   c
435   c
436             subroutine fcnj (n, x, y, pd)
437   c
438   c              DUMMY subroutine required for DEGAR
439   c
440             dimension y(n), pd(n,n)
441             return
442             end
443   c
444   c
445   c
446             subroutine incont (iin, iout, intern, toler, nmax, irstrt)
447   c
448             read (15,*) iin
449             read (15,*) iout
450             read (15,*) intern
451             read (15,*) toler
452             read (15,*) nmax
453             read (15,*) irstrt
454   c
455             return
456             end
457   c
458   c
459   c
460             subroutine getpat (iin, iout, ndim, trina,
461        1             trouta, itrain)
462   c
463   c         input all training pattern
464   c
465             dimension trina(ndim,1), trouta(ndim,1)
466   c
467             itrain = 42
468   c
469             do 100 ipat = 1, itrain
470             read (18,*) (trina(ipat,i),i=1,iin)
471    100      continue
472   c
473             do 110 ipat = 1, itrain
```

```
474             read (18,*) (trouta(ipat,j),j=1,iout)
475    110     continue
476   c
477             write (6,300) itrain
478    300     format (' There are ',I4,' training patterns ...')
479   c
480             return
481             end
482
```

---

File PREDCT.FOR -- VAX FORTRAN Source Code for Prediction with Trained Weights

```
1             program predct
2    c
3    c            Prediction of test formulations:
4    c
5    c                    Inputs:  W matrix
6    c                             L-A-B data
7    c                    Output:  Formulas
8    c
9    c            PARAMETERS
10   c
11   c                    INMAX  = max. number of input nodes
12   c                    INTRNM = max. number of internal nodes
13   c                    ISUSMX = max. number of output nodes
14   c
15            parameter (INMAX = 11)
16            parameter (INTRNM = 10)
17            parameter (ISUSMX = 1)
18            parameter (MAXPAT = 50)
19   c
20            DIMENSION W1(INMAX,INTRNM)
21            DIMENSION W2(INTRNM,ISUSMX)
22            DIMENSION trina(maxpat,inmax), trouta(maxpat,isusmx)
23            DIMENSION TRIN(INMAX), TROUT(ISUSMX)
24            DIMENSION y1(INTRNM), y2(ISUSMX), del(ISUSMX)
25            DIMENSION theta1(intrnm), theta2(isusmx)
26   c
27            call assign (15, 'elec.prm')
28            call assign (16, 'elec.out')
29            call assign (17, 'elec.act')
30            call assign (27, 'elec.win')
31            call assign (18, 'qsm.dat')
32            call assign (28, 'elec.w')
33   c
34   c            input control parameters
35   c
36            call incont (LAB, ISUSED, INTERN, EPSTOL, NITER)
37   c
38   c            read the w matrices
39   c
40            do 1230 j=1,intern
41            read (28,*) (w1(i,j),i=1,lab)
42    1230   continue
43            do 1232 j=1,isused
44            read (28,*) (w2(i,j),i=1,intern)
45    1232   continue
46            read (28,*) (theta1(j),j=1,intern)
47            read (28,*) (theta2(i),i=1,isused)
48   c
49            do 5320 i=1,lab
50            write (27,*) i,(w1(i,j),j=1,intern)
51    5320   continue
52   c
53   c
```

```
 54     c               input training patterns
 55     c
 56             ndim = maxpat
 57             call getpat (lab, isused, ndim, trina, trouta, itrain)
 58     c
 59     c          ... step through the training patterns
 60     c
 61             do 2000 ipat = 1,itrain
 62     c
 63             do 2010 i=1,lab
 64             trin(i) = trina(ipat,i)
 65      2010 continue
 66             do 2022 j=1,isused
 67             trout(j) = trouta(ipat,j)
 68      2022 continue
 69     c
 70     c          ... compute output for this input
 71     c                  at INTERNAL nodes
 72     c
 73             do 218 j=1,intern
 74             test = 0.0
 75     c
 76                     do 216 i=1,lab
 77                     test = test + trin(i)*w1(i,j)
 78      216            continue
 79     c
 80     c          ... perform sigmoid function on "test"
 81     c
 82             y1(j) = sigmod(test+theta1(j))
 83      218   continue
 84     c
 85     c          ... compute output for this input
 86     c                  at OUTPUT nodes
 87     c
 88             do 215 j=1,isused
 89             test = 0.0
 90     c
 91                     do 210 i=1,intern
 92                     test = test + y1(i)*w2(i,j)
 93      210            continue
 94     c
 95     c          ... perform sigmoid function on "test"
 96     c
 97             y2(j) = sigmod(test+theta2(j))
 98      215   continue
 99     c
100     c-ajo-         write (16,*) (trin(i),i=1,lab)
101              write (17,*) ipat,(y1(j),j=1,intern)
102           write (16,*) (trout(j),j=1,isused),(y2(j),j=1,isused)
103     c
104      2000 continue
105     c
106             stop
107             end
108     c
109     c
110     c
111             subroutine incont (LAB, ISUSED, INTERN, EPSTOL, NITER)
112     c
113             read (15,*) lab
114             read (15,*) isused
115             read (15,*) intern
116             read (15,*) epstol
117             read (15,*) niter
118     c
119             return
120             end
121     c
```

```
122     c
123     c
124             function sigmod (x)
125     c
126     c       Sigmoid Function
127     c
128             arg = -x
129             sigmod = 0.0
130             if (arg.lt.69.0) sigmod = 1.0/(1.0+exp(arg))
131     c
132             return
133             end
134     c
135     c
136     c
137             subroutine getpat (lab, isused, ndim, trina,
138          1                      trouta, itrain)
139     c
140     c       input all training pattern
141     c
142             dimension trina(ndim,1), trouta(ndim,1)
143     c
144             itrain = 42
145     c
146             do 100 ipat = 1, itrain
147             read (18,*) (trina(ipat,i),i=1,lab)
148     100     continue
149     c
150             do 110 ipat = 1, itrain
151             read (18,*) (trouta(ipat,i),i=1,isused)
152     110     continue
153     c
154             return
155             end
```

What is claimed is:

1. In a parallel distributed processing network implemented in hardware alone or in a digital computer operating in accordance with a program, the network being of the type having:

- a first, input, set of from one to i processing elements, each input processing element having an input port and an output port, each of the i input processing elements being connectible to an input signal at the input port thereof and each being operable to produce an activation signal A1[i] at the output port thereof;
- a second, intermediate, set of from one to k processing elements, each processing element having an input port and an output port, each of the k intermediate processing elements being operable to produce an activation signal A2[k] at the output port thereof;
- a third, output, set of from one to j processing elements, each processing element having an input port and an output port, each of the j output processing elements being operable to produce an activation signal A3[j] at the output port thereof;
- each of the i processing elements in the input set of processing elements being connected to at least one of the k processing elements in the intermediate set of processing elements with each such interconnection having a connection weight W1[i,k] associated therewith,
- each of the k processing elements in the set of intermediate processing elements being connected to at least one of the j processing elements in the set of output processing elements with each such interconnection having a connection weight W2[k,j] associated therewith,
- the network being arranged such that a set of p training signals, applied at the input ports of the input processing element produces activation signals A1[i,p], A2[k,p] and A3[j,p],
- each of the p training signals being associated with a predetermined one of a set of V predetermined desired output signals, wherein the improvement comprises:

the activation signals A1, A2, and A3 and the connection weights W1, W2 of the interconnections between the input processing elements and the output processing elements being related by a first set of stiff differential equations $$d/dt W1[i,k] = \sum_p A1[i,p]A2[k,p](1 - A2[k,p]) \times$$

-continued $$\sum_j (V[j,p] - A3[j,p])A3[j,p](1 - A3[j,p])W2[k,j]$$

the activation signals A2 and A3 and the connection weights W2 of interconnections between the intermediate processing elements and the output processing elements are related by a second set of stiff differential equations $$d/dt W2[k,j] = \sum_p A2[k,p]A3[j,p](1 - A3[j,p])(V[j,p] - A3[j,p])$$

and wherein the weights W1 and W2 are, respectively, calculated by converging to the steady state solutions of the first and second sets of stiff differential equations.

2. The parallel distributed processing system of claim 1 wherein the output port of each of the i input processing elements is connected to the input port of each of the k intermediate processing elements and wherein the output port of each of the k intermediate processing elements is connected to the input port of each of the j output processing elements.

3. The parallel distributed processing system of claim 2 wherein the means defining the first, second and third sets of processing elements comprises at least one digital computer operating in accordance with a program.

4. The parallel distributed processing system of claim 2 wherein the means defining the first, second and third sets of processing elements comprises interconnected discreet analog components.

5. The parallel distributed processing system of claim 2 wherein the means defining the first, second and third sets of processing elements comprises an integrated circuit having a substrate, the input, intermediate and output layers of processing elements and the interconnection lines therebetween being formed on the substrate.

6. The parallel distributed processing system of claim 1 wherein the means defining the first, second and third sets of processing elements comprises at least one digital computer operating in accordance with a program.

7. The parallel distributed processing system of claim 1 wherein the means defining the first, second and third sets of processing elements comprises interconnected discrete analog components.

8. The parallel distributed processing system of claim 1 wherein the means defining the first, second and third sets of processing elements comprises an integrated circuit having a substrate, the input, intermediate and output layers of processing elements and the interconnection lines therebetween being formed on the substrate.

9. A method for training a parallel distributed processing system of the type having
a first, input, set of from one to i input processing elements, each input processing element having an input port and an output port, each of the i input processing elements being connectible to an input signal at the input port thereof and each being operable to produce an activation signal A1[i] at the output port thereof;
a second, intermediate, set of from one to k intermediate processing elements, each processing element having an input port and an output port, each of the k intermediate processing elements being operable to produce an activation signal A2[k] at the output port thereof;
a third, output, set of from one to j processing elements, each processing element having an input port and an output port, each of the j output processing elements being operable to produce an activation signal A3[j] at the output port thereof;
each of the i input processing elements being connected to at least one of the k intermediate processing elements with each such interconnection having a connection weight W1[i,k] associated therewith,
each of the k intermediate processing elements being connected to at least one of the j output processing elements with each such interconnection having a connection weight W2[k,j] associated therewith,
the network being arranged such that a set of p training signals, applied at the input ports of the input processing elements produces activation signals A1[i,p], A2[k,p] and A3[j,p],
each of the p training signals being associated with a predetermined one of a set of V predetermined desired output signals,
the method comprising the steps of:
(a) defining the relationship between the activation signals A1, A2, A3 and the weights W1 and W2 in the form of a first and a second set of stiff differential equations $$d/dt\ W1[i,k] = \sum_p A1[i,p]A2[k,p](1 - A2[k,p]) \times$$

$$\sum_j (V[j,p] - A3[j,p])A3[j,p](1 - A3[j,p])W2[k,j]$$

and $$d/dt\ W2[k,j] = \sum_p A2[k,p]A3[j,p](1 - A3[j,p])(V[j,p] - A3[j,p]);$$

(b) solving the sets of differential equations to find the values of the weights W1 and W2; and
(c) adjusting the weights of the network such that the weights W1 and W2 correspond to the solution sets of the first and second sets of stiff differential equations.

10. The method of claim 9 wherein the solving step (b) is performed using a digital computer operating in accordance with a program.

11. The parallel distributed processing system defined by the process of claim 10.

12. The parallel distributed processing system defined by the process of claim 9.

* * * * *